United States Patent
Hashi et al.

(10) Patent No.: US 7,652,851 B2
(45) Date of Patent: Jan. 26, 2010

(54) HEAD SUPPORT DEVICE AND DISK DEVICE HAVING THE SAME

(75) Inventors: Hideyuki Hashi, Osaka (JP); Yoshihiro Ueno, Osaka (JP); Makoto Miyamoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 747 days.

(21) Appl. No.: 10/590,864

(22) PCT Filed: Dec. 9, 2005

(86) PCT No.: PCT/JP2005/022643

§ 371 (c)(1),
(2), (4) Date: Aug. 28, 2006

(87) PCT Pub. No.: WO2006/064727

PCT Pub. Date: Jun. 22, 2006

(65) Prior Publication Data

US 2007/0139822 A1 Jun. 21, 2007

(30) Foreign Application Priority Data

Dec. 17, 2004 (JP) .............................. 2004-365680

(51) Int. Cl.
*G11B 5/55* (2006.01)
(52) U.S. Cl. .............. 360/265.6; 360/265.2; 360/265.7; 360/265.9
(58) Field of Classification Search .............. 360/265.2, 360/265.6–265.7, 265.9, 266, 266.1
See application file for complete search history.

(56) References Cited

U.S. PATENT DOCUMENTS

| 2002/0126419 A1* | 9/2002 | Kuwajima et al. | ....... 360/265.7 |
| 2003/0043510 A1* | 3/2003 | Miyamoto et al. | ....... 360/254.7 |
| 2004/0047077 A1* | 3/2004 | Honda et al. | ............. 360/244.2 |
| 2004/0184193 A1* | 9/2004 | Honda et al. | ............. 360/244.2 |
| 2004/0240116 A1* | 12/2004 | Kuwajima et al. | .......... 360/255 |

FOREIGN PATENT DOCUMENTS

| JP | 3374846 | 11/2002 |
| JP | 2004-062936 | 2/2004 |

* cited by examiner

*Primary Examiner*—Andrea L Wellington
*Assistant Examiner*—Carlos E Garcia
(74) *Attorney, Agent, or Firm*—Wenderoth, Lind & Ponack, L.L.P.

(57) ABSTRACT

A head support device of self-balancing type and a disk drive are disclosed. The head support device reduces manufacturing variation in a load and the number of components, and has stability and reliability, while being inexpensive. In this head support device, a flange and a nut cramp, via a collar, a head support arm having a reinforcing plate fixed thereto. The head support arm is supported rotatably about a line provided between contact points at which pivots contact the flange and in a direction perpendicular to a recording medium. A spring as an elastic member provides an urging force toward the recording medium, and is provided unitarily with the head support arm. Bent portions are provided on both sides of the arm composing the head support arm to a tab.

12 Claims, 10 Drawing Sheets

HEAD SUPPORT DEVICE AND DISK DEVICE HAVING THE SAME

TECHNICAL FIELD

The present invention relates to a head support device used in a disk drive including a floating head, such as a magnetic disk drive, an optical disc drive, and a magneto-optical disk drive, and relates to a disk drive using the head support device.

BACKGROUND ART

As having small and thin sizes, disk drives, such as a magnetic disk drive, have been used in mobile devices, and accordingly, have opportunities to receive excessive impact due to strong vibration, dropping, or collision. When receiving such a strong external impact, a magnetic disk drive including a head support device having a floating head exhibits a phenomenon in which a slider jumps off the magnetic recording medium due to unbalance between the floating of the slider caused by an airflow generated by rotation of the magnetic recording medium and an urging force caused by the head support device for urging the slider toward the magnetic recording medium.

At this moment, the slider may be hit the magnetic recording medium, providing magnetic or mechanical damage to the magnetic recording medium or to a magnetic head mounted on the slider. In order to prevent such problems, a self-balancing type head support device is proposed that satisfies demands physically incompatible: a large load on the slider, high flexibility, and additionally high rigidity of the structure, and that has a feature of strong impact resistance. The above-mentioned conventional structure is disclosed in Japanese Patent No. 3374846 and Japanese Patent Laid-Open Publication No. 2004-62936.

Hereinafter, the structure of a self-balancing type head support device in a magnetic disk drive, such as a hard disk drive, as a head support device of a disk drive including a conventional floating head will be described briefly with reference to FIGS. 11 and 12. FIG. 11 is a side view of the conventional self-balancing head support device. FIG. 12 is an exploded perspective view of the conventional self-balancing head support device.

As shown in FIGS. 11 and 12, slider 111 having a magnetic head (not shown) on a bottom surface thereof is mounted onto one end of support arm 112. Another end of support arm 112 is attached fixedly to one end of plate spring 113. Another end of plate spring 113 contacts pivot bearing 115 through spring fixing member 114. Bearing 117 is a rotation center for rotating support arm 112 in the radial direction of magnetic recording medium 116 Flange 117a and nut 118 of bearing 117 cramp plate spring 113 and spring fixing member 114. Thus, another end of plate spring 113 is fixed to pivot bearing 115.

Spring fixing member 114 is cramped through projection 119a having a half-annular shape. Projection 119a has a shape substantially identical to that of a portion of spring fixing member 114 contacting spring fixing member 114, and is provided on hollow collar 119. This arrangement allows support arm 112 to be retained elastically on pivot bearing 115 through plate spring 113.

Pivot bearing 115 has a pair of tops 115a and 115b. Tops 115a and 115b contact support arm 112 at contact points Pa and Pb, respectively. The one end of support arm 112 is urged toward magnetic recording medium 116 by an elastic force of plate spring 113. At this moment, a compression stress occurs at contact points Pa and Pb. Tops 115a and 115b of pivot bearing 115 are perpendicular to a longitudinal direction of support arm 112 and to a rotation center axis about which support arm 112 rotates in the radial direction of magnetic recording medium 116. Tops 115a and 115b contact support arm 112 on the line passing through the rotation center axis.

The gravity center of a portion retained by plate spring 113 matches the gravity center of support arm 112 having voice coil 120 and coil holder 121 attached thereto when rotated by a voice coil motor. The head support device is designed so that this gravity center matches substantially with an intersecting point between the rotation axis (not shown) in the radial direction of support arm 112 and the rotation axis perpendicular to a recording surface of magnetic recording medium 116. In other words, the head support device is designed so that the gravity center matches substantively with middle point P (not shown) of the line connected between contact points Pa and Pb at which support arm 112 contacts tops 115a and 115b, respectively. This structure provides a stable self-balancing type head support device having large impact resistance against an external impact.

However, in the conventional self-balancing head type support device, a small gap exists between a hollow portion of collar 119 and cylinder portion 117c of bearing 117 fitting the hollow portion. The small gap provided between collar 119 and bearing 117 may cause a contact position of projection 119a of collar 119 contacting plate spring 113 to vary when plate spring 113 is cramped by fitting thread portion 117b of bearing 117 to nut 118. This variation may change the effective length of a spring portion of plate spring 113, and thus, may change its spring repulsive force, causing a load on magnetic recording medium 116 to vary.

Similarly to this, regarding the fitting between pivot bearing 115 and cylinder portion 117c of bearing 117, the small gap may cause the positional relationship between support arm 112, pivot bearing 115, and bearing 117 to vary. In other words, contact points Pa and Pb contacting tops 115a and 115b of pivot bearing 115 may vary. Similarly to the variation of the contact point of projection 119a of collar 119, a load due to a compression stress toward the magnetic recording medium 116 may vary as a reactive force due to deformation of plate spring 113.

SUMMARY OF THE INVENTION

The present invention provides a head support device of self-balancing type and a disk drive including the support device. The head support device reduces manufacturing variation in a load and the number of components, and has stability and reliability, while being inexpensive.

The head support device of self-balancing type according to the present invention has a rotation axis about which a head support arm is rotatable in a radial direction of a recording medium. The head support device is roratable in a direction perpendicular to the recording medium about a line substantially perpendicular to the rotation axis and a center line. The head support device of self-balancing type includes a head support arm, a bearing, a head slider, a voice coil holder, a reinforcing plate, a collar, and a nut. The head support arm includes an arm and a spring. The arm has one end and another end. The arm has a tab at the one end thereof and having a hole formed therein at the another end thereof. The arm further has pivots positioning the hole between the pivots. The spring has a cramp and an elastic force generator portion provided at an end of the spring. The end of the spring is connected with the arm.

The bearing includes a flange at one end thereof, a thread portion formed at another end thereof, and a cylinder portion provided between the flange and the thread portion. The head slider is provided at the one end of the arm. The head slider is arranged to have a head fixed thereto via a gimbal mechanism. The voice coil holder is fixed to the head support arm. The voice coil holder has a voice coil provided at the voice coil holder. The voice coil rotates the head support arm in the radial direction of the recording medium about the rotation axis.

The reinforcing plate has a shape substantially identical to a shape of the cramp. The reinforcing plate is fixed to a predetermined position of the cramp at a side opposite to a projecting direction of the pivots. The collar fits the cylinder portion and contacts the reinforcing plate. The nut fits the thread portion. The flange and the nut sandwich and cramp the head support arm having the reinforcing plate fixed thereto. The head support arm is supported rotatably about a line provided between contact points at which the pivots contact the flange and in a direction perpendicular to the recording medium. The spring as an elastic member generates an urging force toward the recording medium and is provided unitarily with the head support arm.

The head support device may further include bent portions at both sides of the arm at a side to the tab. A portion of the voice coil holder at an end opposite to a side at which the voice coil is provided may be fixed to the head support arm overlapping portions of the bent portions along a direction of the rotation axis center.

According to the above structure, the head support arm includes the spring as the elastic force generator portion formed unitarily with the head support arm as the elastic member for apply a load for urging the head slider. Portions of the arm becomes a rigid body by providing bends portions at both sides of the arm, and by fixing a portion of the voice coil holder so as to overlap a portion of the arm having the bent portions formed thereon, thus increasing the rigidity of the arm. This allows parts having the rigid body and elasticity to be formed just like being integrated. This provides extremely high impact resistance and a high resonance frequency against an external impact applied, thus providing the head support device with an excellent response property, capable of high-speed access.

In the head support device according to the present invention, the reinforcing plate is fixed to the head support arm, thereby providing a reliable load. The length of a part of the spring having elasticity of the head support arm can be clearly predetermined. As a result that the head support device according to the present invention is rotatably structured in a direction perpendicular to the surface of the recording medium, the head can be retained off the recording medium while the recording medium stops.

In the head support device according to the present invention, the cramp and the reinforcing plate may have substantially half-annular shape. In a direction perpendicular to a longitudinal direction of the head support arm, an end of the reinforcing plate may have a width larger than a width of the cramp coupled with the elastic force generator portion.

According to the above structure, the part of the spring having elasticity is not influenced even if the positional relationship between the cramp and the reinforcing plate slightly deviates in a direction perpendicular to a longitudinal direction of the head support arm, when the reinforcing plate is fixed to the cramp. This provides a stable urging force, a stable load, thus providing a reliable head support device.

In the head support device according to the present invention, the collar may have a collar projection having a shape substantially identical to a shape of the reinforcing plate. The collar projection presses the reinforcing plate to cramp the head support arm. Further, in the head support device according to the present invention, a distance from an end of the collar projection closer to the rotation axis center, to a diameter line of the rotation axis perpendicular to a center line in a longitudinal direction of the head support arm may be smaller than a distance from an end of the reinforcing plate closer to the rotation axis, to the diameter line of the rotation axis. Further, a thickness of the reinforcing plate may be larger than a projection height of each of the pivots. The collar may have an annular shape having both end surfaces which are perpendicular to an axis center of the collar and are parallel with each other.

The above structure does not prevent the head support arm from rotation, while the contact points of the tops of the pivots and the flange of the bearing, as supporting points, in a direction perpendicular to the recording medium during operation of the head support device. Further, even if deviation in position of the collar in the longitudinal direction of the head support arm occurs due to a fit clearance between the collar and the cylinder portion fitting the collar, forming of a part having elasticity in the spring of the head support arm will not be affected because the both ends of the reinforcing plate can be pressed by the collar. Therefore, a stable urging force can be applied to the support arm, and a stable load is available, thus providing a reliable head support device.

In the head support device according to the present invention, the reinforcing plate may have a projection on a side of an outer shape thereof. Further, in the head support device according to the present invention, the projection of the reinforcing plate may be provided on a side of the reinforcing plate facing the rotation axis, and may project in a longitudinal direction of the head support arm while the projection is fixed to the head support arm. Moreover, in the head support device according to the present invention, the reinforcing plate may have a tolerance on a side facing the rotation axis, and the projection of the reinforcing plate may be provided on a side of the tolerance.

The above structure allows a lot of reinforcing plates to be produced from a flat plate for the reinforcing plate, and allows the reinforcing plates to be fixed to plural head support arms at predetermined positions, respectively. Further, the projection of the reinforcing plate does not prevent the head support arm from rotating in a direction perpendicular to the recording medium, and thus provides a stable urging force a stable load, thus providing a reliable head support device.

A disk drive according to the present invention includes a recording medium rotating with a spindle motor, and the head support device having the above structure.

A manufacturing variation in load, and the number of components for constructional elements is reduced. A disk drive of self-balancing type having a large stability and reliability and being inexpensive is provided.

REFERENCE NUMERALS

1 Rotation Center
2 Rotation Axis
3 Rotor Hub
4 Magnetic Recording Medium
5 Rotation Axis
5a Rotation Axis Center
6 Bearing
7 Head Support Device
8, 62 (Head) Support Arm
8a, 62b Arm
8b Tab
8c, 62d Spring
8d, 62c Cramp
8e, 62a Elastic Force Generator Portion
8f, 32a Hole
8g Pivot
8h, 62f Base
8i Virtual Point
8j Center Line of Head Support Arm
8k, 84a Line
8m Dimple
8n Notch Hole
8p Bent portion
9 (Head) Slider
9a (Magnetic) Head
10 Voice Coil
11 Magnet
12 Upper Yoke
13 Lower Yoke
14 Ramp
15 Ramp Block
16, 17 Crash Stop
31 Gimbal Mechanism
32 (Voice) Coil Holder
33, 82 Reinforcing Plate
33a, 36b, 82b End
33b, 82c Edge
33c, 36c Diameter Line
34 Bearing
34a Flange
34b Thread portion
34c Cylinder portion
35 Nut
36 Collar
36a Collar Projection
37 Balancer
61 Spring-Material Thin Plate
61a, 61b, 61c, 81a Positioning Reference Hole
62e Contact Portion
63, 86 Retaining Joint
64, 84 Recess (Run-off Part)
65, 83 Joint
66, 85 Cut-off Part
81 Flat Plate for Reinforcing Plate
82a Projection of Reinforcing Plate
91, 92 Contact Point

DETAILED DESCRIPTION OF THE PREFERRED EMBODIMENT

Hereinafter, an exemplary embodiment of the present invention will be described with referring to drawings. A magnetic disk drive will be described as a disk drive.

Exemplary Embodiment

Figure 1:
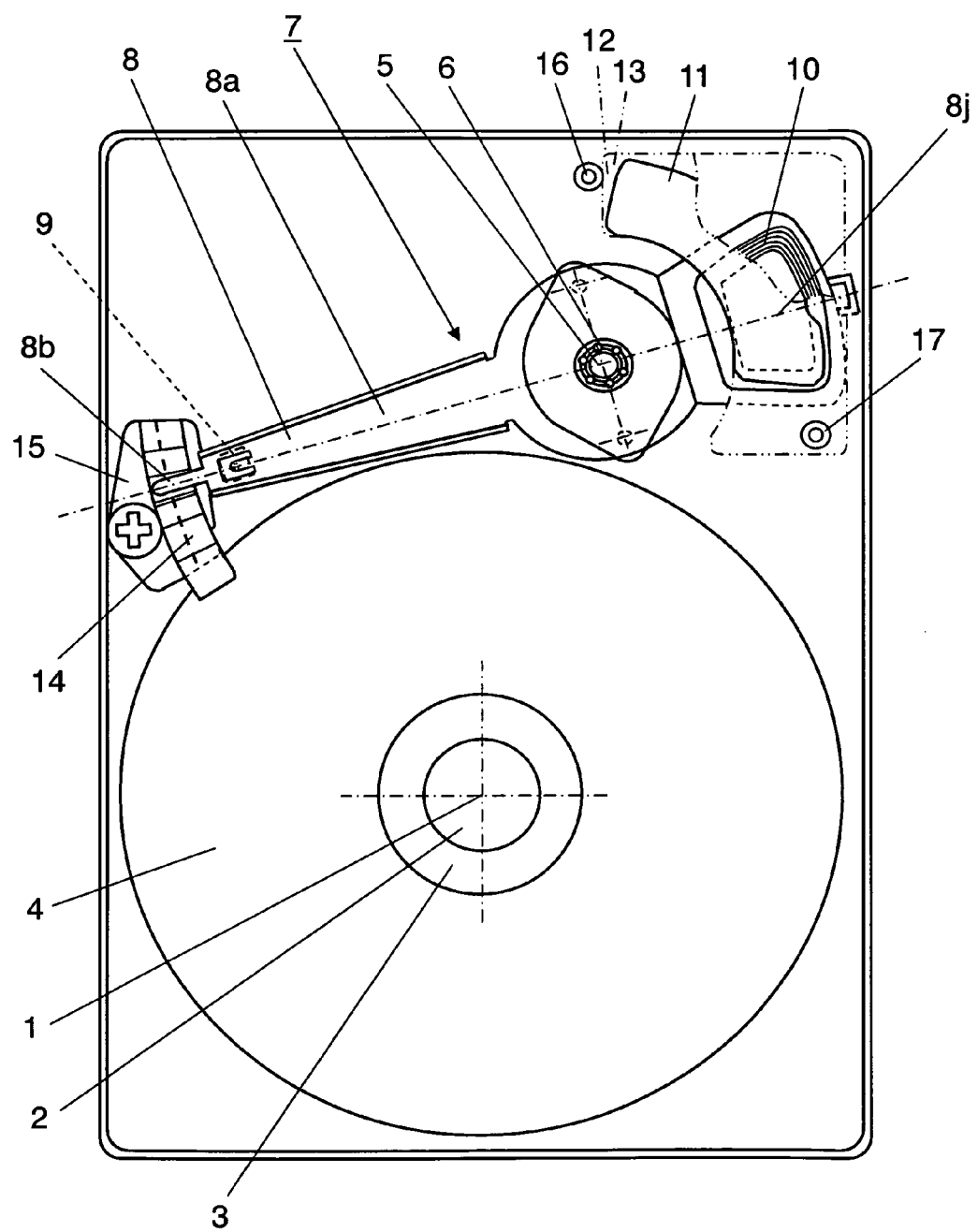
FIG. 1 is a plan view of an essential portion of a magnetic disk drive according to an exemplary embodiment of the present invention.
Figure 2:
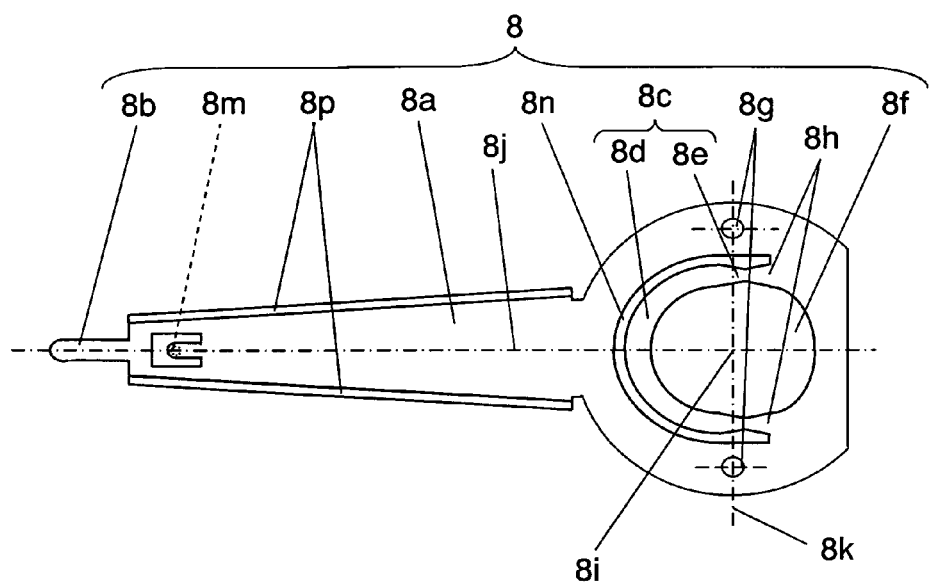
FIG. 2 is a plan view of a head support arm of a head support device according to the embodiment.
Figure 3:
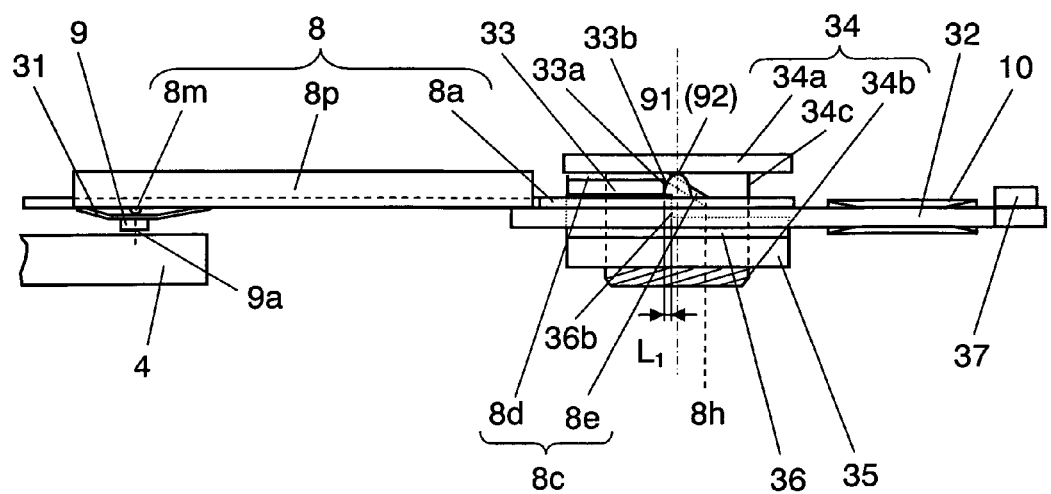
FIG. 3 is a schematic side view of the head support device according to the embodiment.
Figure 4:
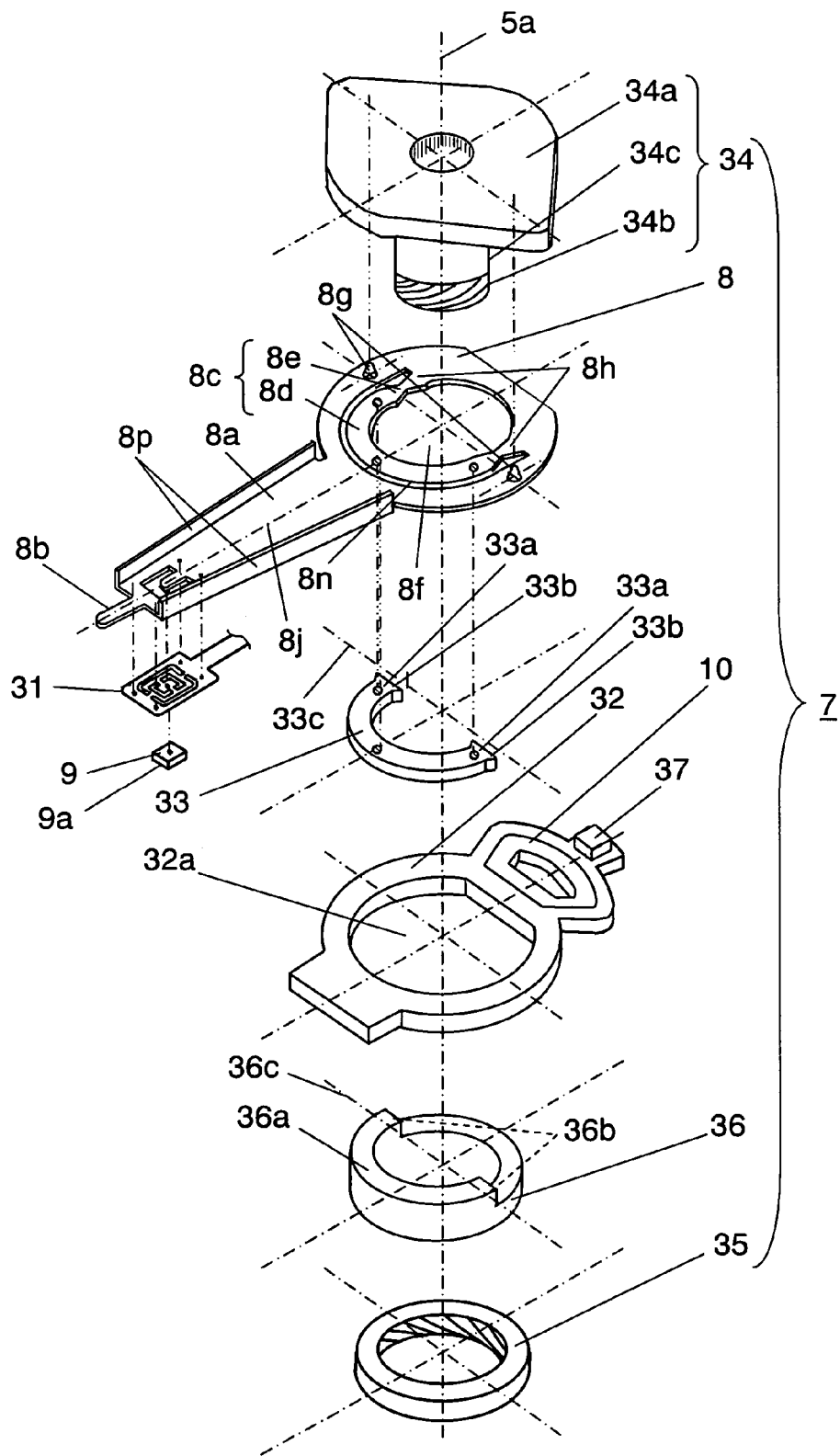
FIG. 4 is an exploded perspective view of the head support device according to the embodiment.
Figure 5:
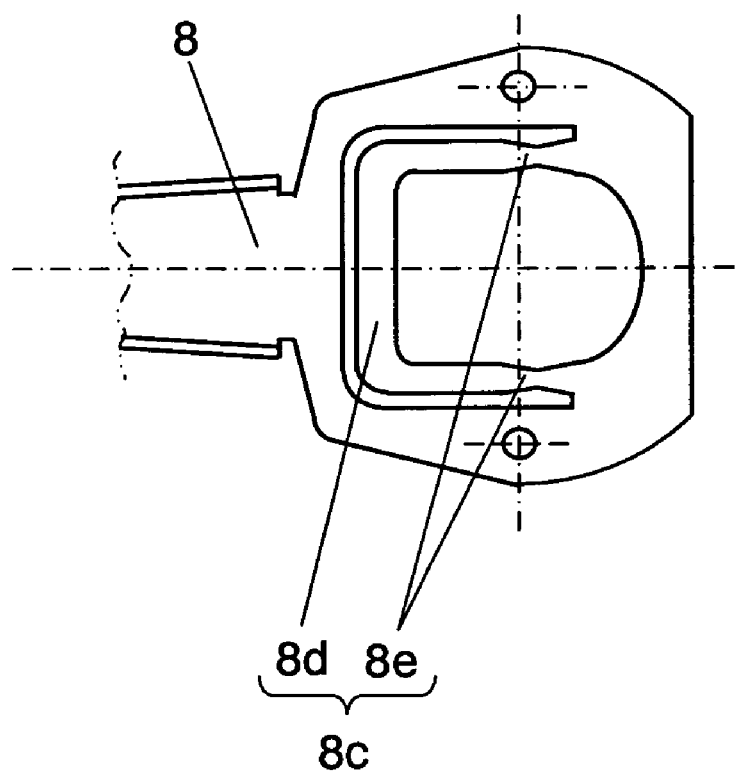
FIG. 5 is a partial plan view of a spring of the head support device according to the embodiment.

FIG. 1 is a plan view of an essential portion of a magnetic disk drive according to an exemplary embodiment of the present invention. FIG. 2 is a plan view of a head support arm of a head support device according to the embodiment. FIG. 3 is a schematic side view of the head support device according to the embodiment. FIG. 4 is an exploded perspective view of the head support device according to the embodiment. FIG. 5 is a partial plan view of another spring of the head support device according to the embodiment. FIG. 1 illustrates the drive having a top lid removed and does not show an upper yoke partially.

As shown in FIG. 1, magnetic recording medium 4 with a recording medium layer formed on its surface is placed on rotor hub 3 fixed to rotation axis 2 of the spindle motor (not illustrated) which rotates about rotation center 1. Head support device 7 is an arm arranged to swing a signal conversion element, and is supported with bearing 6 pivotably and rotatably about rotation axis 5. Head support device 7 includes tab 8b formed on one end of arm 8a of head support arm 8. Head support device 7 includes head slider 9 having a magnetic head (not illustrated), the signal conversion element, provided, via a gimbal mechanism (not illustrated), at a side closer to rotation axis 5 than to tab 8b.

Voice coil 10 is provided at the other end of arm 8a and rotates about rotation axis 5 in the radial direction of magnetic recording medium 4 and in the direction parallel to the surface. Magnet 11 is fixed to upper yoke 12 so that magnet 11 faces voice coil 10 above voice coil 10, namely, is provided at the side opposite to magnetic recording medium 4, of head support device 7. Upper yoke 12 is mounted to a chassis (not illustrated) or another cabinet (not illustrated)

A voice coil motor (not illustrated) includes voice coil 10, lower yoke 13, upper yoke 12, and magnet 11. Lower yoke 13 is attached to the chassis or another cabinet, and faces voice coil 10 below voice coil 10, so that lower yoke 13 and the chassis or the cabinet sandwich voice coil 10. Magnet 11 is fixed to upper yoke 12 facing voice coil 10. A guide (not illustrated) contacts tab 8b and guides head support device 7 vertically. Ramp block 15 has ramp 14 provided thereon with the guide and is mounted to the chassis or the cabinet.

An electric current is supplied to voice coil 10 facing magnet 11, activating the voice coil motor to rotate head support device 7 in the radial direction of magnetic recording medium 4.

While the magnetic disk drive operates, head support device 7 rotates about rotation axis 5 to move above a data recording area of magnetic recording medium 4 during the rotation. While the disk drive does not operate, head support device 7 rotates clockwise to a predetermined position of ramp 14, namely, a stand-by position. As known, crash stoppers 16 and 17 are provided on the chassis, cabinet, or other structural member in order to prevent head support device 7 from excessively swinging clockwise or counterclockwise.

The structure of head support device 7 will be described with referring to FIGS. 2 to 4.

As shown in FIG. 2, in head support arm 8, tab 8b is provided on one end of arm 8a. Spring 8c is provided on the other end of arm 8a. Hole 8f is provided inside spring 8c. Two pivots 8g are provided at positions sandwiching spring 8c and hole 8f. Spring 8c includes cramp 8d contacting a step surface of bearing 34 expanding like a sword guard, and elastic force generator portion 8e, an elastic member for generating a load.

In spring 8c, one end of elastic force generator portion 8e is connected with arm 8a at base 8h. The other end of part 8e is connected to cramp 8d. Cramp 8d is not connected with arm 8a, thus being an open end. Two pivots 8g are provided at positions sandwiching spring 8c and hole 8f. The positions of pivots 8g is provided at both sides opposite to each other about virtual point 8i and apart by the same distances from point 8i, and on line 8k which passes through virtual point 8i of hole 8f and which is substantially perpendicular to longitudinal center line 8j of head support arm 8. Virtual point 8i substantially coincides with rotation axis center 5a of rotation axis 5 about which head support device 7 rotates, as described later.

Bent portions 8p are provided at both sides of arm 8a extending along the longitudinal direction of arm 8a so as to increase the rigidity of arm 8a. Bent portions 8p are formed by bending arm 8a in the projecting direction of two pivots 8g provided on arm 8a. Bent portions 8p are provided at both sides from the end at tab 8b to a position which overlaps, in the direction of rotation axis center 5a, one end of a voice coil holder (not illustrated in FIG. 2) fixed to head support arm 8, in the direction of rotation axis center 5a.

Bent portions 8p provided at both sides of arm 8a of head support arm 8 are bent in the projecting direction of pivots 8g provided on arm 8a. Bent portions 8p may be bent in the direction opposite to the projecting direction of pivots 8g.

As shown in FIGS. 3 and 4, head slider 9 has magnetic head 9a mounted thereto via gimbal mechanism 31, and is provided on head support arm 8.

Dimple 8m is provided on a bottom surface of head support arm 8 so as to contact a portion near the center of head slider 9. While head slider 9 is attached via gimbal mechanism 31, dimple 8m contacts gimbal mechanism 31 or a top surface of head slider 9 directly. The top surface of head slider 9 is opposite to the surface of slider 9 having magnetic head 9a thereon. This structure allows head slider 9 during operation of the magnetic disk drive to flexibly follow vibration in a rolling or pitching direction relative to magnetic recording medium 4.

Voice coil holder 32 is fixed to head support arm 8. Voice coil holder 32 has voice coil 10 attached thereto and has hole 32a therein. As described above, a portion of voice coil holder 32, i.e., one end of voice coil holder 32 opposite to voice coil 10 overlaps, in the direction along rotation axis center 5a, a portion of arm 8a between bent portions 8p provided at both sides of arm 8a.

Coil holder 32 is fixed to head support arm 8 at plural fixing positions. At least one fixing position out of the fixing positions is provided on arm 8a. Head support arm 8 with voice coil holder 32 fixed thereto has high rigidity since having voice coil holder 32 with high rigidity fixed thereto, having bent portions 8p formed thereon, and having voice coil holder 32 fixed to arm 8a between bent portions 8p at both sides.

Reinforcing plate 33 is fixed onto a predetermined position of the surface of cramp 8d at a side to head slider 9 with using a known technique, such as spot welding. Reinforcing plate 33 has a substantially half-annular shape, i.e., a horseshoe shape, which is substantially identical to that of cramp 8d which has reinforcing plate 33 fixed thereto.

A portion of cramp 8d with reinforcing plate 33 fixed thereto has a large rigidity, thus becoming a substantially rigid portion. Spring 8c has elastic-force-generating portion 8e which is provided from a portion contacting edge 33b of reinforcing plate 33 to base 8h of spring 8c. Elastic-force-generating portion 8e exhibits a spring property for generating a load on the head support device.

The width of head support arm 8 in a direction perpendicular to the longitudinal direction of head support arm 8 at end 33a of reinforcing plate 33 is preferably larger than that of cramp 8d contacting edge 33b. This structure causes edge 33b to contact the entire width of cramp 8d even if reinforcing plate 33 deviates from cramp 8d in the direction perpendicular to the longitudinal direction of head support arm 8 when reinforcing plate 33 is fixed to cramp 8d.

Reinforcing plate 33 is fixed to cramp 8d preferably at one or more positions near each of ends 33a of reinforcing plate 33.

Bearing 34 includes flange 34a, thread portion 34b, and cylinder portion 34c, and has a cylindrical and hollow shape with a member like a sword guard. Flange 34a contacts cramp 8d and two pivots 8g. Flange 34a has a step surface expanding like a sword guard. Thread portion 34b fits nut 35 at the end opposite to flange 34a, as described later. Cylinder portion 34c has a diameter as to fit collar 36 between flange 34a and thread portion 34b.

Collar 36 has an inner diameter fitting cylinder portion 34c. Collar 36 has an outer diameter passing hole 32a of voice coil holder 32, and is smaller than an outer dimension of notch hole 8n provided outside spring 8c of head support arm 8 shown in FIG. 2. Collar 36 has a cylindrical and hollow shape and has collar projection 36a having a half-annular shape which is substantially identical to that of reinforcing plate 33 to be contacted.

End 36b of collar projection 36a is provided at the side closer to rotation axis center 5a. Bearing 34 is perpendicular to longitudinal center line 8j of head support arm 8. End 33a of reinforcing plate 83 is provided at the side closer to rotation axis center 5a. The distance from end 36b of collar projection 36a to bearing 34, namely, to diameter line 36c of rotation axis 5, is smaller than the distance from end 33a of reinforcing plate 33 to diameter line 33c of rotation axis 5. When reinforcing plate 33 is pressed, both ends 36b of collar projection 36a protrude beyond both ends 33a of reinforcing plate 33.

In other words, distance $L_1$ shown in FIG. 3 between end 33a of reinforcing plate 33 and end 36b of collar 36, that is, an amount by which end 36b of collar projection 36a projects from end 33a of reinforcing plate 33, is larger than zero ($L_1 > 0$). Thus, collar projection 36a has a length larger than that of reinforcing plate 33 in a circumferential direction. This structure allows collar projection 36a to press both ends 33a of reinforcing plate 33, even if collar projection 36a is displaced from reinforcing plate 33, when collar projection 36a presses reinforcing plate 33 fixed to spring 8c of head support arm 8.

Therefore, respective edges 33b at both ends 33a causes cramp 8d of spring 8c of head support arm 8 to reliably contact the step surface of flange 34a of bearing 34 expanding like a sword guard.

Bearing 34 penetrates hole 8f of head support arm 8 so that the step surface of flange 34a of bearing 34 contacts tops of pivots 8g provided on head support arm 8 at contact points 91 and 92, respectively. Collar 36 is engaged and inserted into cylinder portion 34c of bearing 34 so that the top surface of collar projection 36a contacts and presses a bottom surface of reinforcing plate 33 fixed to cramp 8d of head support arm 8.

Nut 35 is tightened to thread portion 34b of bearing 34, accordingly cramping head support arm 8 between flange 34a of bearing 34 and nut 35 via collar 36. This arrangement causes head support arm 8 to be elastically retained by bearing 34 via spring 8c. Thus, head slider 9 is mounted with bearing 34 and gimbal mechanism 31, and voice coil 10 is mounted with voice coil holder 32. Head support arm 8 with reinforcing plate 33 fixed thereto, collar 36, and nut 35 provide head support device 7.

Then, respective positions of the pair of pivots 8g provided on arm 8a of head support arm 8 will be described below. Pivots 8g are provided on the step surface of flange 34a of bearing 34 expanding like a sword guard, so that the line connecting contact points 91 and 92 at which pivots 8g contact the step surface of flange 34a of bearing 34 passes across rotation axis center 5a, and the line is perpendicular to longitudinal center line 8j of head support arm 8 composing head support device 7 shown in FIG. 4. Contact points 91 and 92 are preferably arranged symmetrically with respect to rotation axis center 5a of head support device 7, thus causing the middle point of the line between contact points 91 and 92 to coincide substantially with rotation axis center 5a.

The above structure allows head support arm 8 to contact the step surface of flange 34a of bearing 34 at contact points 91 and 92, and allows head support arm 8 to rotate around line 8k provided between contact points 91 and 92 of pivots 8g and in a direction perpendicular to the surface of magnetic recording medium 4. Then, an elastic force generated by elastic force generator portion 8e of head support arm 8 urges one end of head support arm 8 toward magnetic recording medium 4. This urging force causes head support arm 8 to rotate counterclockwise about line 8k, generating compression stress at contact points 91 and 92.

The compression stress applied from pivots 8g to head support arm 8 toward magnetic recording medium 4 at contact points 91 and 92 produces a load of head slider 9 applied to magnetic recording medium 4 during operation of the magnetic disk drives.

This load can be set to a desired value according to the following condition. This condition relates to material of head support arm 8, namely material of elastic force generator portion 8e of spring 8c, a length of elastic force generator portion 8e, a height of pivot 8g, and the positional relationship between elastic force generator portion 8e of spring 8c and pivot 8g.

Pivot 8g is formed unitarily with head support arm 8, hence reducing manufacturing variation of the positions of pivots 8g with respect to elastic force generator portion 8e. Reinforcing plate 33 can be fixed to spring 8c while being positioned with respect to cramp 8d. This arrangement accordingly reduces manufacturing variation of the elastic force generated by elastic force generator portion 8e, thus providing head support device 7 with a small manufacturing variation of load. The load can be independently determined only according to the design of head support arm 8.

Balancer 37 may be fixed to one end of voice coil holder 32. The weight of balancer 37 is adjusted to cause the gravity center of head support device 7 to coincide substantially with the middle point of the line provide between contact points 91 and 92 of pivots 8g. In other words, the gravity center of head support device 7 coincides substantially with rotation axis center 5a. Head slider 9 is fixed to head support arm 8 via the gimbal mechanism. Voice coil 10 is fixed to head support arm 8 via voice coil holder 32. The gravity center of head support arm 8 with head slider 9, the gimbal mechanism, voice coil 10, and voice coil holder 32 may coincide substantially with rotation axis center 5a. Even in this case, the gravity center of head support arm 8 does not deviate practically from the gravity center of head support device 7.

Balancer 37 is fixed to one end of voice coil holder 32. However, balancer 37 may be fixed to head support arm 8 close to head slider 9 according to the distribution of respective weights of components composing head support device 7.

In head support device 7 mentioned above, a line through the gravity center of head support device 7 perpendicular to the surface of magnetic recording medium 4 pass across the line provided between contact points 91 and 92 of pivots 8g of head support arm 8. The line provided between contact points 91 and 92 of pivots 8g becomes a rotation axis for rotation of head support arm 8 in a direction perpendicular to the surface of magnetic recording medium 4, thus positioning the total gravity center of head support device 7 on a plane perpendicular to magnetic recording medium 4 including this rotation axis.

When head support device 7 receives an impact force due to an external impact, the force does not cause head support device 7 to rotate about the rotation axis provided between contact points 91 and 92 of pivots 8g of head support arm 8. This fact prevents head slider 9 from colliding against the surface of magnetic recording medium 4 and from damaging the magnetic recording medium 4, providing high reliability.

Head support device 7 mentioned above allows the specification of elastic force generator portion 8e to be designed as to provide elastic force generator portion 8e with a desired load. The specification of elastic force generator portion 8e includes, for example, its material, its thickness, its width, and its length. The length corresponds to the distance from the position where reinforcing plate 33 contacts edge 33b to base 8h of elastic force generator portion 8e. Bent portions 8p provided at the both sides of arm 8a and voice coil holder 32 fixed to it increase the rigidity of arm 8a.

The specification of elastic force generator portion 8e and the high rigidity of arm 8a provides head support arm 8a with impact resistance against an external, large impact, and raise a resonance frequency of head support arm 8. Therefore, a vibration mode conventionally problematic does not occur, thus necessitating no settling operation. Consequently, head support device 7 can be rotated and positioned at a high speed, accordingly increasing an access speed of the magnetic disk drive.

Firstly, head support arm 8 of head support device 7 according to the present invention includes arm 8a having elastic force generator portion 8e of spring 8c, the elastic member, unitarily provided with arm 8a. Secondly, arm 8 has bent portions 8p and voice coil holder 32 fixed thereto as to increase rigidity of arm 8a. Arm 8a having high rigidity and elastic force generator portion 8e of spring 8c having flexibility, i.e., components separated from each other, provide a large load to head slider 9 and high flexibility of head slider 9, respectively, which are physically incompatible demands, as effects of the component independently.

Thus, head support device 7 can be designed easily and flexibly.

Head support arm 8 of head support device 7 according to the present invention does not require a process for precisely forming a plate spring which is required for a conventional head support arm, being formed more easily than the conventional device. The thickness and the material of spring 8c can be independently determined, allowing the strength and spring constant of spring 8c to be easily determined to predetermined values.

Arm 8a requiring rigidity is adjusted in the height of the bent sides of arm 8a, increasing rigidity of arm 8a easily. Spring 8c is provided unitarily with arm 8a of head support arm 8, and reduces the number of components for composing the head support device more than that of a conventional self-balancing head support device, accordingly reducing a manufacturing cost of a self-balancing head support device.

If the thickness of reinforcing plate 33 is sufficiently larger than the projection height of pivot 8g of head support arm 8, i.e., the distance from the surface of arm 8a on which pivot 8g is formed to the distal end of the projected portion, the collar projection 36a is not necessary, but may have an annular shape perpendicular to the axis center of collar 36. In this case, collar 36 may have a ring shape having surfaces parallel to each other.

As shown in FIG. 2, the open end of spring 8c provided on head support arm 8, namely, the portion of the spring 8c to which reinforcing plate 33 is fixed does not necessarily have an arc shape shown in FIG. 2, but may have a rectangular shape shown in FIG. 5. In this case, reinforcing plate 33 and collar projection 36a may have rectangular shapes similarly to spring 8c.

The head support device according to the embodiment of the invention is the magnetic disk drive, but not limited to this. The invention may apply to a non-contact recording and reproducing disk drive, such as a magneto-optical disk drive or optical disk drive.

As described above, the head support device according to the embodiment reduces a variation of the length of the elastic force generator portion, a factor influencing the generating of the load. Further, the head support device reduces a variation of the height of the pivots and a variation of the positional relationship between the elastic force generator portion and the pivots, which are both other factors influencing the generating of the load, as well. Accordingly, a variation of an elastic force generated by the elastic force generator portion of the head support arm is reduced, and a variation of the load is accordingly reduced. The elastic force generator portion 8e is unitarily formed with spring 8c, hence reducing the number of components. The head support device of self-balancing type which is inexpensive and reliable and has a large resistance to impact is provided.

This head support device of self-balancing type provides a disk drive having excellent characteristics of controlling head positioning, and moves the magnetic head to a target track position at a high speed to reduce the access time.

Next, a method of fixing the head support arm to the reinforcing plate of the head support device according to the embodiment will be described below.

Figure 6:
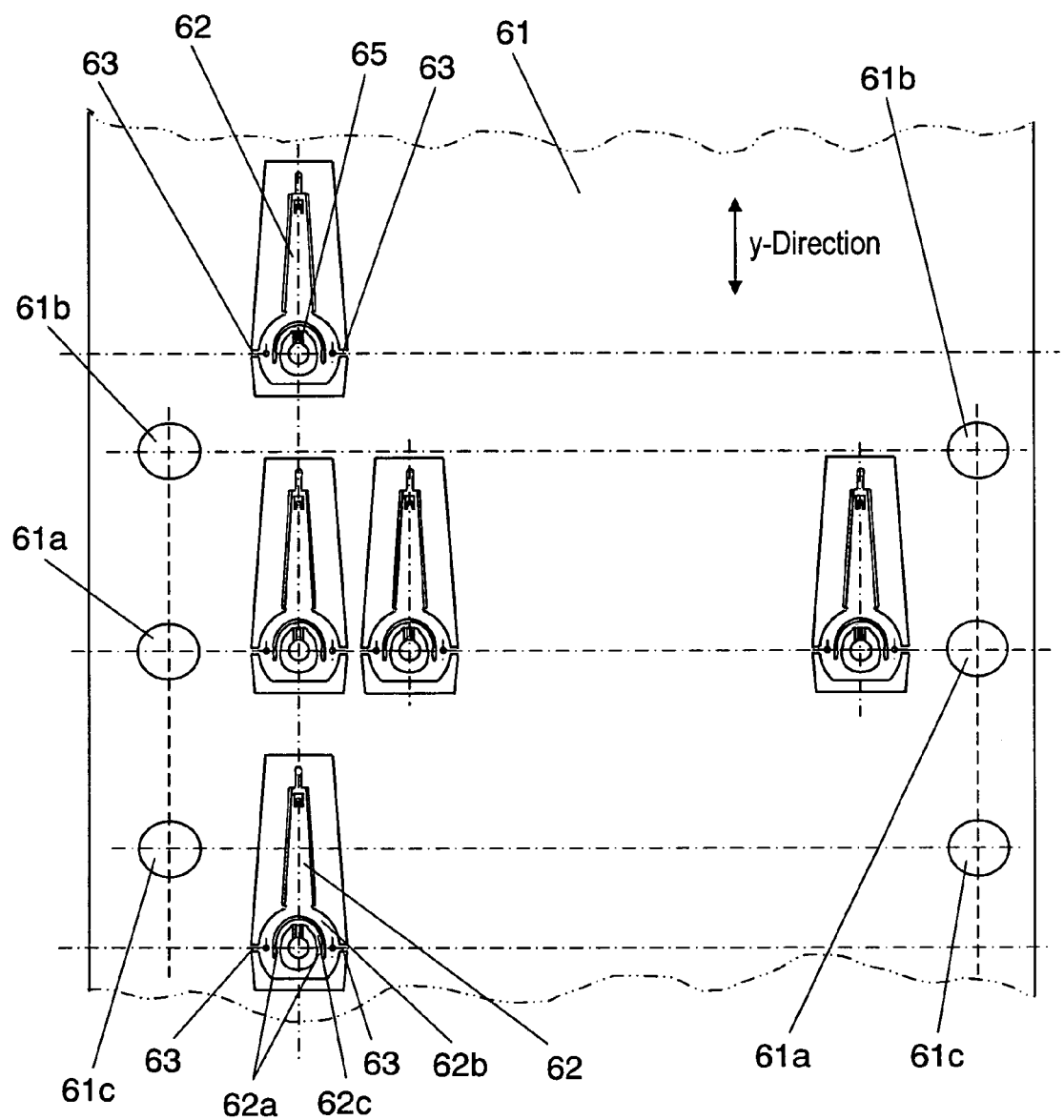
FIG. 6 is a plan view of a spring-material thin plate having plural head support arms formed therein of the head support device according to the embodiment.
Figure 7:
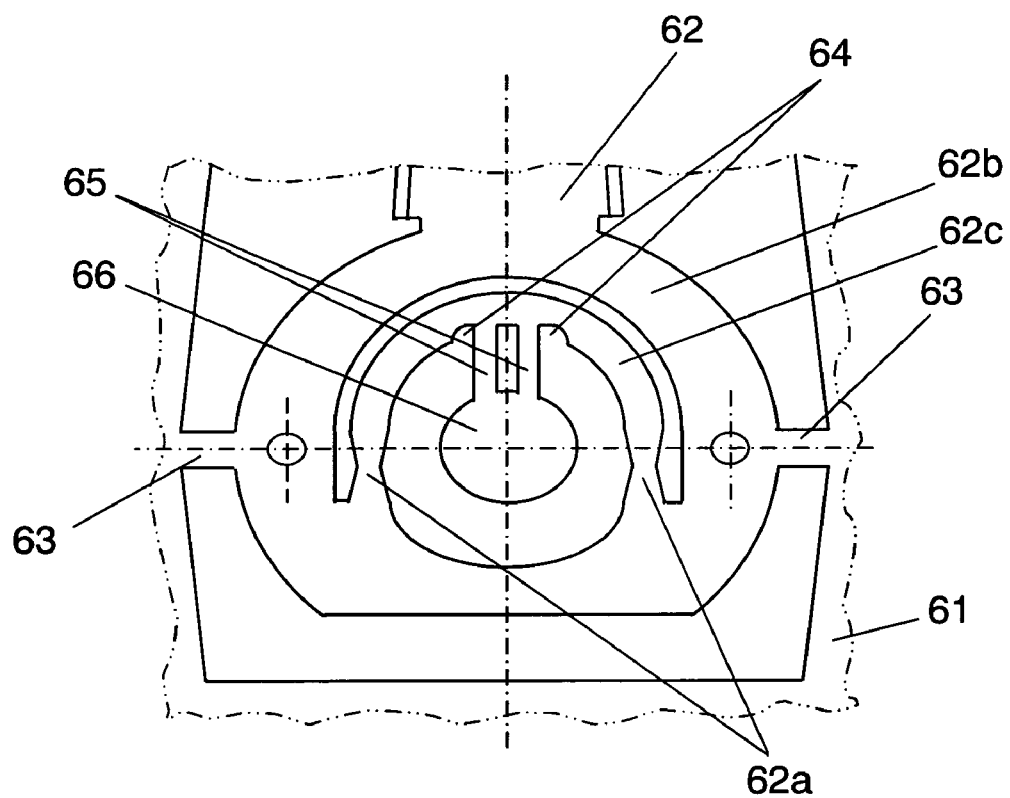
FIG. 7 is an enlarged partial view of the head support arm formed in the spring-material thin plate of the head support device according to the embodiment.

FIG. 6 is a plan view of a spring-material thin plate having plural head support arms of the head support device according to the embodiment formed therein. FIG. 7 is an enlarged partial view of a head support arm of the head support device according to the embodiment formed in the spring-material thin plate.

Figure 8:
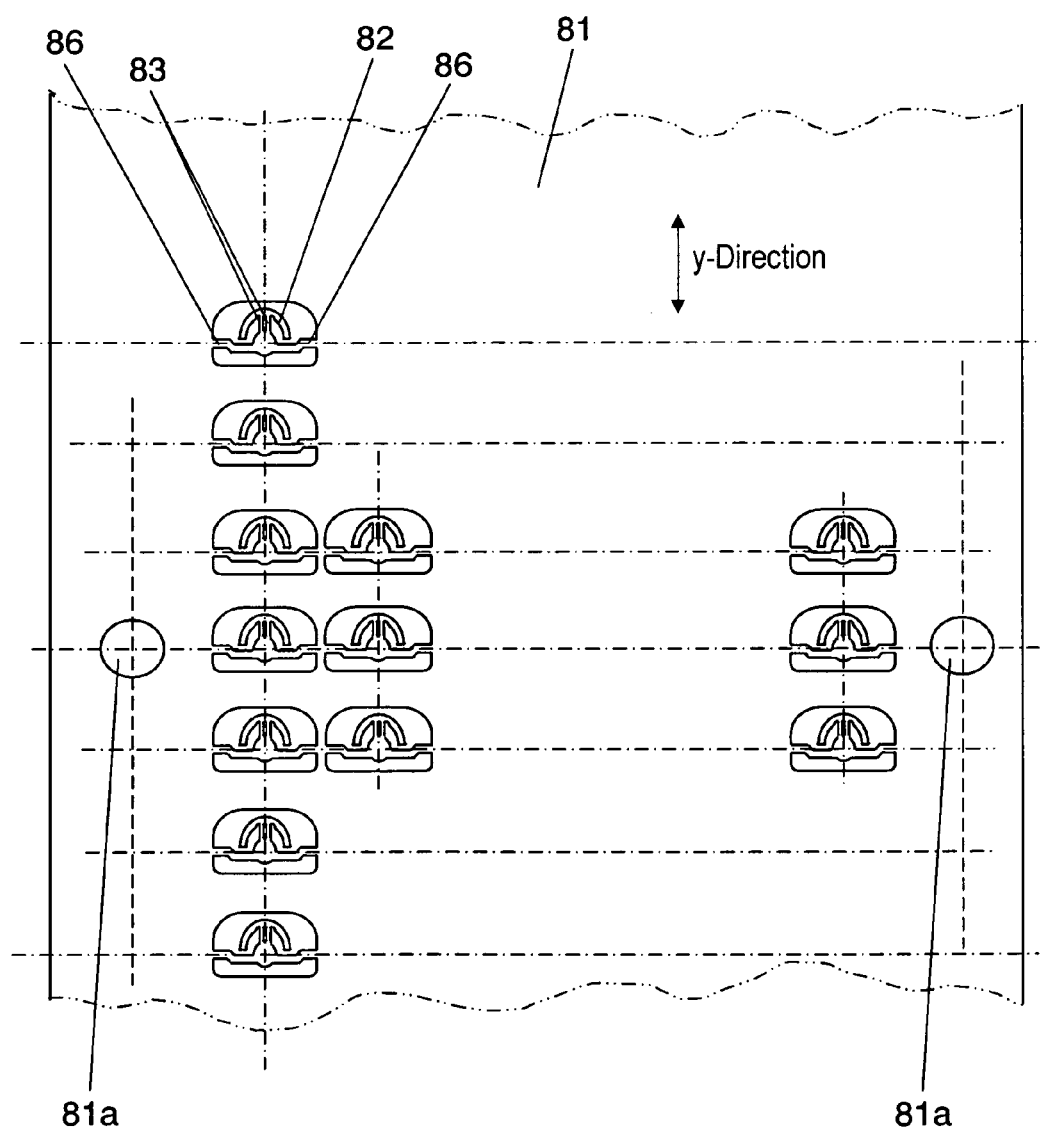
FIG. 8 is a plan view of a flat plate having a lot of reinforcing plates formed therein of the head support device according to the embodiment.
Figure 9:
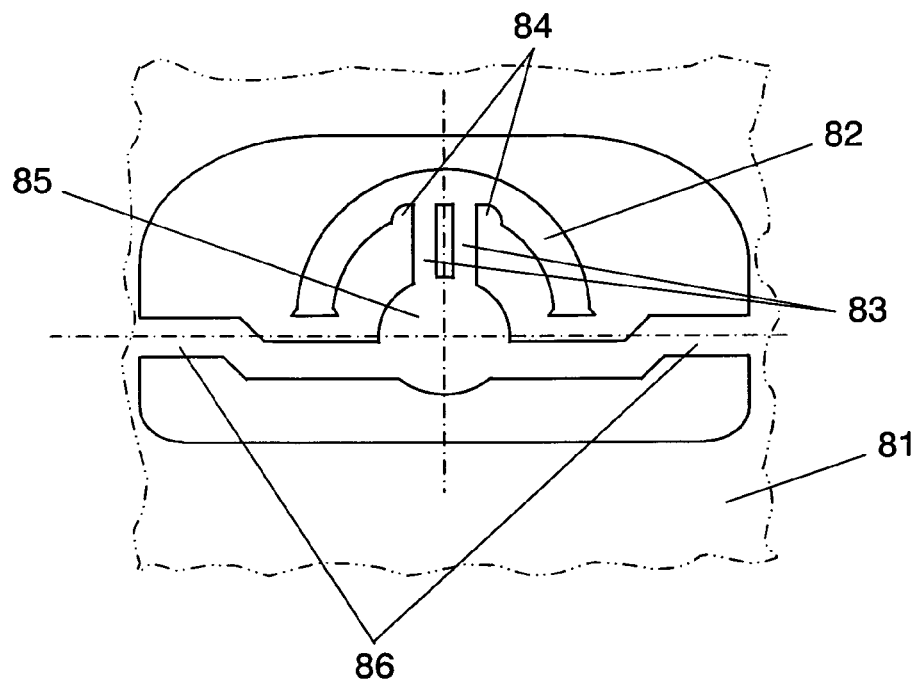
FIG. 9 is an enlarged partial view of the reinforcing plate formed in the plane board of the head support device according to the embodiment.
Figure 10:
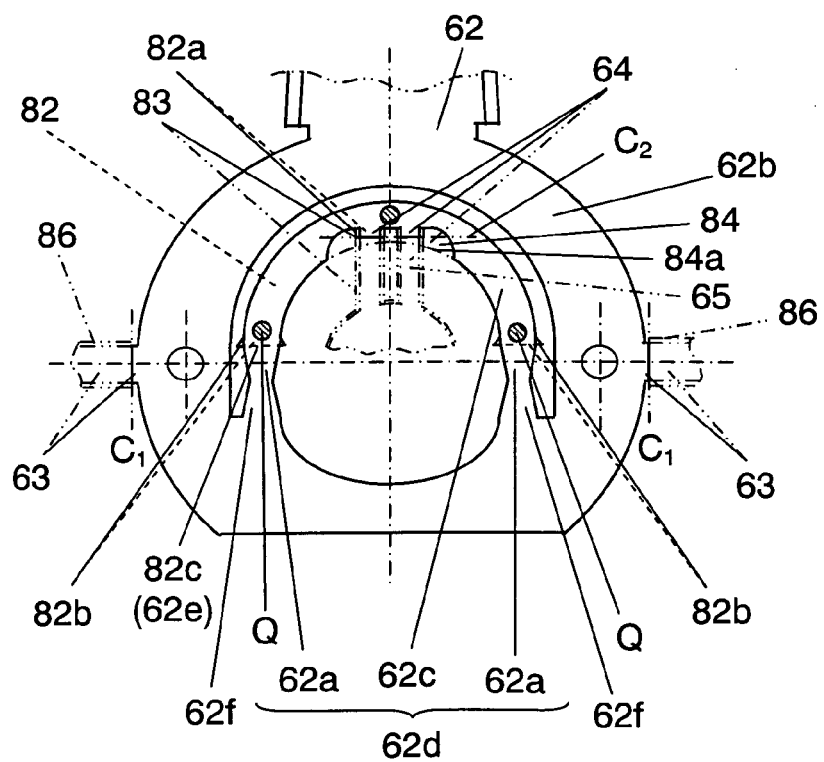
FIG. 10 is an enlarged partial plan view of a fixed of the reinforcing plate of the head support device according to the embodiment.
Figure 11:
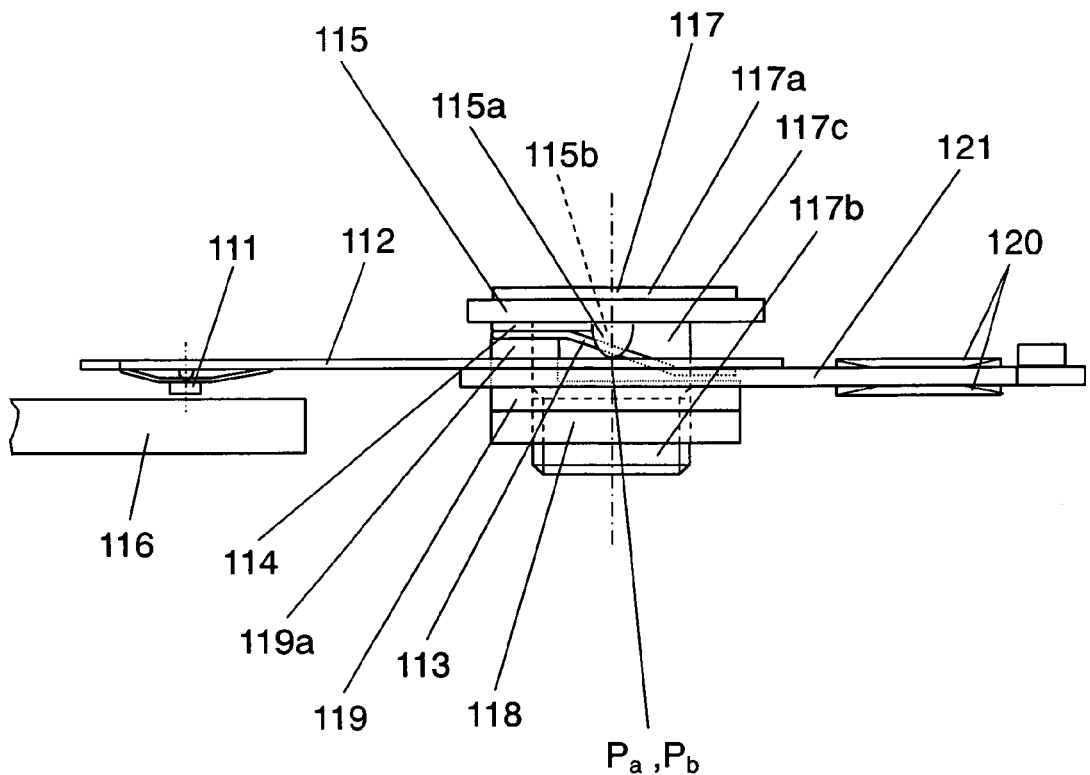
FIG. 11 is a side view of a conventional self-balancing type head support device.
Figure 12:
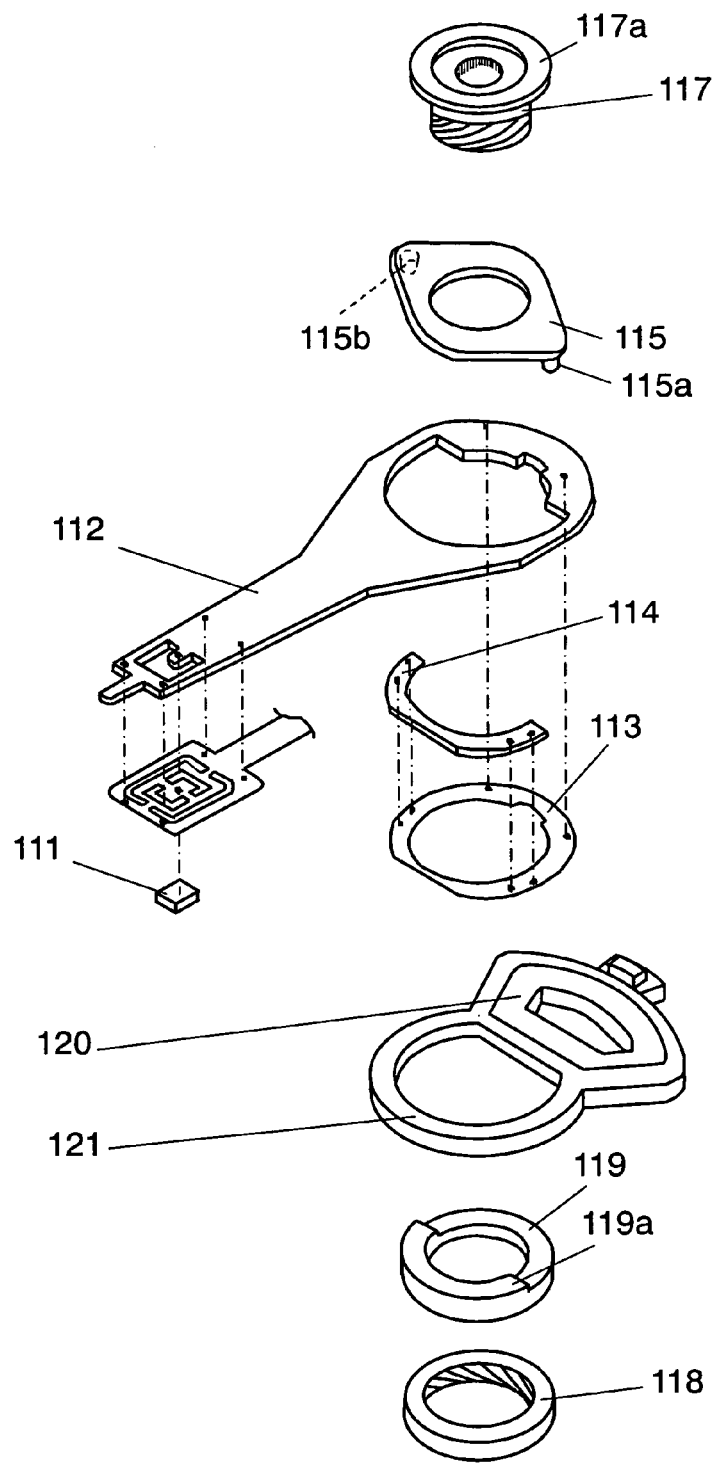
FIG. 12 is an exploded perspective view of the conventional self-balancing type head support device.

FIG. 8 is a plan view of a plate for the reinforcing having plural reinforcing plates of the head support device according to the embodiment formed therein. FIG. 9 is an enlarged partial view of the reinforcing plate formed in the plate for the reinforcing plate of the head support device according to the embodiment. FIG. 10 is an enlarged plan view of a portion of the head support device to be fixed to the reinforcing plate according to the embodiment.

As shown in FIG. 6, plural head support arms 62 coupled with each other via retaining joints 63 are formed in the spring-material thin plate 61 by a known method, such as etching. Spring-material thin plate 61 provides design specifications required for allowing elastic force generator portion 62a to generate a predetermined load, i.e., a predetermined elastic force.

As shown in FIG. 7, head support arm 62 is coupled with and retained by spring-material thin plate 61 via retaining joints 63 extending from both sides of arm 62b. Recess 64 having a substantially rectangular shape and serving as a tolerance is formed at a small diameter side of cramp 62c, i.e., at a position closer to a rotation center of rotation axis 5. Joints 65 project toward recess 64. Portion 66 to be cut off is provided at respective another ends of joints 65. FIGS. 6 and 7 show two of joints 65, but the number of joints 65 is not limited to this. The number of the joints may be one or more. Joint 65 and portion 66 to be cut off may not necessarily be required.

As shown in FIG. 8, plural reinforcing plates 82 are formed in rigid flat plate 81 having a predetermined thickness for the reinforcing plate, while reinforcing plates 82 are coupled to flat plate 81 with joints 83 and retaining joints 86 to be retained in flat plate 81. As shown in FIG. 9, similarly to the recess at the small diameter side of cramp 62c, recess 64 having a substantially rectangular shape and serving as a tolerance is formed at the small diameter side of reinforcing plate 82 having a half annular shape at a rotation center side of rotation axis 5, similarly to cramp 62c.

Joints 83 are formed on reinforcing plate 82 so as to project toward recess 84, and coupled to flat plate 81 for the reinforcing plate via retaining joint 86 and portion 85 to be cut-off, so as to be formed unitarily with flat plate 81. Flat plate 81 for the reinforcing plate is placed on spring-material thin plate 61, joint 83 and retaining joint 86 overlap joint 65 and retaining joint 63 provided in spring-material thin plate 61, respectively. Respective widths of joint 83 and retaining joint 86 are larger than those of joint 65 and retaining joint 63, respectively.

Joint 83 may be connected directly with retaining joint 86 without portion 85 to be cut off. The number of joints 83 is two, but maybe one or more. Retaining joint 86 may not necessarily overlap retaining joint 63. Retaining joint 86 may be provided at a position which retains reinforcing plate 82 to flat plate 81 and which allows the reinforcing plate to be cut off after flat plate 81 is fixed to head support arm 62.

First spring-material thin plate 61 having plural head support arms 62 formed therein is attached onto flat plate 81 for the reinforcing plate, so that respective ones of plural reinforcing plates 82 overlap predetermined positions corresponding to respective ones of cramps 62c of plural head support arms 62 formed in first spring-material thin plate 61. In addition, second spring-material thin plate 61 is attached onto flat plate 81 for the reinforcing plate while second spring-material thin plate 61 is displaced by pitches in the y-direction shown in FIG. 8, i.e., in the longitudinal direction of head support arm 62 formed in second spring-material thin plate 61. This arrangement allows plural reinforcing plates 82 to overlap cramps 62c of head support arms 62 formed in second spring-material thin plate 61.

Thus, plural spring-material thin plates 61 are attached onto flat plate 81 for the reinforcing plate, so that the number of spring-material thin plates 61 corresponds to the number of pitches of reinforcing plates 82 in the y-direction within a single pitch in the y-direction shown in FIG. 6, i.e., in the longitudinal direction of head support arms 62 formed in a single spring-material thin plate 61. A lot of reinforcing plates 82 are formed in flat plate 81 for the reinforcing plate, so that all reinforcing plates 82 formed in flat plate 81 for the reinforcing plate overlap predetermined positions corresponding to cramps 62c of plural head support arms 62 formed in plural spring-material thin plates 61, and so that waste of material of flat plate 81 after being processed is reduced in order to use the material efficiently.

As shown in FIGS. 6 and 8, a pair of positioning reference holes 61a are formed in spring-material thin plate 61. Plural head support arms 62 formed in spring-material thin plate 61 are positioned with reference to positioning reference holes 61a. Positioning reference holes 61b and 61c are formed corresponding to the pitch, so that spring-material thin plate 61 is positioned corresponding to each pitch of in the y-direction of reinforcing plates 82 formed in flat plate 81 for the reinforcing plate shown in FIG. 8.

A pair of positioning reference holes 81a are provided in flat plate 81 for the reinforcing plate corresponding to positioning reference holes 61a provided in spring-material thin plate 61. Plural reinforcing plates 82 are formed at positions corresponding to cramps 62c of head support arms 62 formed in spring-material thin plate 61 with reference to positioning reference holes 81a. In other words, plural reinforcing plates 82 are positioned by the same pitch as those lengthwise and breadthwise of cramps 62c.

The pitch of spring-material thin plate 61 is displaced so that positioning reference hole 81a in flat plate 81 for the reinforcing plate corresponds to another positioning reference hole 61b provided in spring-material thin plate 61. At this moment, plural reinforcing plates 82 are formed at positions in flat plate 81 corresponding to cramps 62c of plural head support arms 62 formed in spring-material thin plate 61 with reference to positioning reference hole 61b provided in spring-material thin plate 61.

The pitch of spring-material thin plate 61 is displaced so that positioning reference hole 81a in flat plate 81 for the reinforcing plate corresponds to another positioning reference hole 61c provided in spring-material thin plate 61. In this case, the situation is the same, and its description is omitted. Thus, as plural spring-material thin plates 61 are attached onto a single flat plate 81 for the reinforcing plate by displaced pitches, all reinforcing plates 82 formed in the single flat plate 81 are positioned at predetermined positions of cramps 62c of head support arm 62s formed in spring-material thin plates 61.

Then, processes for fixing reinforcing plate 82 to head support arm 62 will be described. First, reinforcing plate 82 of plate 81 is attached onto cramp 62c of first spring-material thin plate 61 with their positions aligned with using positioning reference holes 81a provided in plate 81 for the reinforcing plate, and using positioning reference hole 61a provided in first spring-material thin plate 61. Cramps 62c of each of head support arms 62 formed in spring-material thin plate 61 is fixed to each of reinforcing plates 82 in plate 81 for the reinforcing plate overlapping cramps 62c by a known technique, such as spot welding.

Then, retaining joint 63 and joint 65 coupled with head support arm 62 and retaining joints 86 and joints 83 coupled with reinforcing plate 82 overlapping retaining joint 63 and joint 65 are cut off by a known technique, such as laser processing or press working, to produce plural head support arms 62 with reinforcing plate 82 fixed to cramp 62c. Then, positioning reference hole 81a provided in plate 81 for the reinforcing plate and positioning reference hole 61b provided in second spring-material thin plate 61 are used to attach reinforcing plate 82 in plate 81 for the reinforcing plate onto cramps 62c in second spring-material thin plate 61, with their positions aligned.

Cramps 62c of head support arms 62 formed in second spring-material thin plate 61 are fixed to reinforcing plates 82 in plate 81 overlapping cramps 62c by a known technique, such as spot welding. Then, retaining joint 63 and joint 65 coupled with head support arm 62 and retaining joints 86 and joints 83 coupled with reinforcing plate 82 overlapping retaining joint 63 and joint 65 are cut off by a known technique, such as laser processing or press working, to produce plural head support arms 62 with reinforcing plates 82 fixed to cramps 62c.

Similarly to above, positioning reference hole 81a provided on reinforcing-plate-destined plain board 81 and positioning reference hole 61c provided on third spring-material thin plate 61 are used to attach reinforcing plates 82 in plate 81 for the reinforcing plate onto cramps 62c in third spring-material thin plate 61 with their positions aligned. Cramps 62c of head support arms 62 formed in third spring-material thin plate 61 are fixed to reinforcing plates 82 in plate 81 overlapping cramps 62c by a known technique, such as spot welding. Then, retaining joint 63 and joint 65 coupled with head support arm 62, and retaining joints 86 and joints 83 of reinforcing plate 82 overlapping retaining joint 63 and joint 65 are cut off by a known technique, such as laser processing or press working, to yet further produce plural head support arms 62 with reinforcing plate 82 fixed to cramps 62c. These processes are repeated to mass-producing head support arms 62 with reinforcing plate 82 fixed to cramp 62c.

As shown in FIG. 10, retaining joint 63 of head support arm 62 and retaining joint 86 on reinforcing plate 82 overlapping retaining joint 63 are cut off at cut-off position $C_1$. Joint 65 of head support arm 62 and joint 83 on reinforcing plate 82 overlapping joint 65 are cut off at cut-off position $C_2$, thus providing head support arm 62 with reinforcing plate 82 fixed to cramp 62c.

In this case, while retaining joint 63 and joint 65 of head support arm 62 and joint 83 and retaining joint 86 of reinforcing plate 82 overlapping retaining joint 63 and joint 65 are cut off, case of retaining joint 63 and retaining joint 86, cut-off position $C_1$ is positioned preferably as close to arm 62b of head support arm 62 as possible.

Regarding the cutting of joint 65 and joint 83, cut-off position $C_2$ is positioned preferably closer to recess 84 than to line 84a having an arc shape composing an inner surface at the small diameter side of reinforcing plate 82, in the opening of recess 84 formed on reinforcing plate 82. Consequently, a portion of joint 83 from the side surface of recess 84 of reinforcing plate 82 to cut-off position C2 remains as reinforcing plate projection 82a at recess 84 in reinforcing plate 82 fixed to head support arm 62.

Cramp 62c of head support arm 62 is fixed to reinforcing plate 82 with spot welding or the like at positions preferably near ends 82b of reinforcing plate 82, as shown by dots Q in FIG. 10. Being fixed near ends 82b of reinforcing plate 82, spring 62d including cramp 62c and elastic force generator portion 62a is prevented from floating off from an edge of reinforcing plate 82, when head support arm 62 is assembled with reinforcing plate 82 to provide the head support device.

Spring 62d deforms at a portion contacting edge 82c of reinforcing plate 82, and the elastic force generator portion of spring 62d for generating the load as the head support device has a length from contacting point 62e contacting edge 82c to base 62f of spring 62d. Plural head support arms 62 are fixed to plural reinforcing plates 82 with their positions aligned with reference to the positioning reference hole, and hence, reduce the variation of the mounting position of reinforcing plate 82 with respect to head support arm 62, thereby reducing the variation of the load on the head support device when assembled as the head support device.

Thus, the head support arm according to the embodiment is produced with using head support arm 62 having reinforcing plate 82 fixed thereto. This structure reduces the variation in specifications of the spring of the head support arm, and accordingly reduces the variation of the load as the head support device.

The method for fixing the head support arm to the reinforcing plate of the head support device according to the embodiment reduces the variation of the position of the reinforcing plate fixed to the cramp. This method allows the elastic force generator portion generating the load to have a size, particularly a predetermined length exhibiting a small variation. This provides a stable load having a small variation, thus providing the head support device having high manufacturing quality and high reliability.

INDUSTRIAL APPLICABILITY

A head support device according to the present invention provides a stable load having a small variation to a recording medium to improve stability and reliability. This head support device is useful for a magnetic recording and reproducing device, and non-contact type disk recording and reproducing device, such a magneto-optical disk drive and optical disc drive, using a head.

The invention claimed is:

1. A head support device of self-balancing type arranged to be used with a recording medium, said head support device being operable to support a head accessing said recording medium, said head support device comprising:
    a head support arm having a center line and a rotation axis about which said head support arm is rotatable in a radial direction of the recording medium, said head support device being rotatable in a direction perpendicular to the recording medium about a line substantially perpendicular to the rotation axis and the center line, the head support arm including
        an arm having one end and another end, the arm having a tab at the one end thereof and having a hole formed therein at the another end thereof, the arm further having pivots positioning the hole between the pivots, and
        a spring having a cramp and an elastic force generator portion provided at an end of the spring, the end of the spring being connected with the arm;
    a bearing including a flange at one end thereof, a thread portion formed at another end thereof, and a cylinder portion provided between the flange and the thread portion;
    a head slider provided at the one end of the arm, the head slider being arranged to have said head fixed thereto via a gimbal mechanism;
    a voice coil holder fixed to the head support arm, the voice coil holder having a voice coil provided at the voice coil holder, the voice coil rotating the head support arm in the radial direction of the recording medium about the rotation axis;
    a reinforcing plate having a shape substantially identical to a shape of the cramp, the reinforcing plate being fixed to a predetermined position of the cramp at a side opposite to a projecting direction of the pivots;
    a collar fitting the cylinder portion and contacting the reinforcing plate; and
    a nut fitting the thread portion,
    wherein the flange and the nut sandwich and cramp the head support arm having the reinforcing plate fixed thereto,
    wherein the head support arm is supported rotatably about a line provided between contact points at which the pivots contact the flange and in a direction perpendicular to the recording medium, and
    wherein the spring as an elastic member generates an urging force toward the recording medium and is provided unitarily with the head support arm.

2. The head support device as defined in claim 1, further comprising bent portions at both sides of the arm at a side to the tab.

3. The head support device as defined in claim 2, wherein a portion of the voice coil holder at an end opposite to a side at which the voice coil is provided is fixed to the head support arm overlapping portions of the bent portions along a direction of the rotation axis center.

4. The head support device as defined in claim 1,
    wherein the cramp and the reinforcing plate have substantially half-annular shape, and
    wherein, in a direction perpendicular to a longitudinal direction of the head support arm, an end of the reinforcing plate has a width larger than a width of the cramp coupled with the elastic force generator portion.

5. The head support device as defined in claim 1,
    wherein the collar has a collar projection having a shape substantially identical to a shape of the reinforcing plate, and
    wherein the collar projection presses the reinforcing plate to cramp the head support arm.

6. The head support device as defined in claim 5, wherein a distance from an end of the collar projection closer to the rotation axis center, to a diameter line of the rotation axis perpendicular to a center line in a longitudinal direction of the head support arm is smaller than a distance from an end of the reinforcing plate closer to the rotation axis, to the diameter line of the rotation axis.

7. The head support device as defined in claim 1, wherein a thickness of the reinforcing plate is larger than a projection height of each of the pivots.

8. The head support device as defined in claim 5, wherein the collar has an annular shape having both end surfaces which are perpendicular to an axis center of the collar and are parallel with each other.

9. The head support device as defined in claim 1, wherein the reinforcing plate has a projection on a side of an outer shape thereof.

10. The head support device as defined in claim 9, wherein the projection of the reinforcing plate is provided on a side of the reinforcing plate facing the rotation axis, and projects in a longitudinal direction of the head support arm while the projection is fixed to the head support arm.

11. The head support device as defined in claim 9, wherein the reinforcing plate has a tolerance on a side facing the rotation axis, and the projection of the reinforcing plate is provided on a side of the tolerance.

12. A disk device comprising:
    a recording medium rotating with a spindle motor; and
    a head support device of self-balancing type having a rotation axis about which a head support arm is rotatable in a radial direction of a recording medium, the head support device being rotatable in a direction perpendicular to the recording medium about a line substantially perpendicular to the rotation axis and a center line, said head support device of self-balancing type, wherein the head support device of self-balancing type comprises:

a head support arm including
- an arm having one end and another end, the arm having a tab at the one end thereof and having a hole formed therein at the another end thereof, the arm further having pivots positioning the hole between the pivots, and
- a spring having a cramp and an elastic force generator portion provided at an end of the spring, the end of the spring being connected with the arm;

a bearing including a flange at one end thereof, a thread portion formed at another end thereof, and a cylinder portion provided between the flange and the thread portion;

a head slider provided at the one end of the arm, the head slider being arranged to have a head fixed thereto via a gimbal mechanism;

a voice coil holder fixed to the head support arm, the voice coil holder having a voice coil provided at the voice coil holder, the voice coil rotating the head support arm in the radial direction of the recording medium about the rotation axis;

a reinforcing plate having a shape substantially identical to a shape of the cramp, the reinforcing plate being fixed to a predetermined position of the cramp at a side opposite to a projecting direction of the pivots;

a collar fitting the cylinder portion and contacting the reinforcing plate; and a nut fitting the thread portion, wherein the flange and the nut sandwich and cramp the head support arm having the reinforcing plate fixed thereto, wherein the head support arm is supported rotatably about a line provided between contact points at which the pivots contact the flange and in a direction perpendicular to the recording medium, and wherein the spring as an elastic member generates an urging force toward the recording medium and is provided unitarily with the head support arm.

* * * * *